United States Patent [19]

Howard

[11] Patent Number: 5,241,318

[45] Date of Patent: Aug. 31, 1993

[54] METHOD AND APPARATUS OF GENERATING SUM OR DIFFERENCE SIGNALS CORRESPONDING TO AN APPARENT BEAM IN A MONOPULSE RADAR SYSTEM

[75] Inventor: Dean D. Howard, La Plata, Md.

[73] Assignee: The United States of America as represented by the Secretary of the Navy, Washington, D.C.

[21] Appl. No.: 889,920

[22] Filed: May 29, 1992

[51] Int. Cl.[5] ............................................. G01S 13/44
[52] U.S. Cl. .................................................... 342/149
[58] Field of Search ............... 342/149, 146, 140, 139, 342/133, 131, 80

[56] References Cited

U.S. PATENT DOCUMENTS

| | | | |
|---|---|---|---|
| 3,229,283 | 1/1966 | Mefter et al. | 342/148 |
| 3,293,648 | 12/1966 | Kuhn | 342/149 |
| 3,378,849 | 4/1968 | Letellier | 342/427 |
| 3,480,960 | 11/1969 | Zulch et al. | 342/149 |
| 3,579,239 | 7/1970 | Purcell, Jr. et al. | 342/149 |
| 3,740,750 | 6/1973 | Moulton | 342/152 |
| 3,890,617 | 6/1975 | Moulton | 342/149 |
| 3,969,726 | 7/1976 | Birleson | 342/152 |
| 4,086,590 | 4/1978 | Goggins, Jr. | 342/149 |
| 4,387,373 | 6/1983 | Longuemare, Jr. | 342/149 |
| 4,568,940 | 2/1986 | Diamond | 342/149 |
| 4,821,039 | 4/1989 | Crane | 342/149 |

OTHER PUBLICATIONS

Noblit, Reliability Without Redundancy From A Radar Monopulse Receiver, Dec. 1967, pp. 56–60.
A. B. Mays et al., "Microcomputer Aided Tradking (MCAT)," NRL Report 8709 (Jul. 12, 1983).

Primary Examiner—Daniel T. Pihulic
Attorney, Agent, or Firm—Edward F. Miles; Thomas E. McDonnell

[57] ABSTRACT

The invention relates to an apparatus and method for generating target range, azimuth angle, or elevation angle output signals corresponding to an apparent beam in a multiple-feed monopulse radar system. The multiple-feed monopulse radar system according to the present invention includes a transmitter/receiver unit, an adder/subtracter unit and a video comparator/adder unit. The transmitter/receiver unit is used to generate first and second actual antenna beams. Echoes caused by such actual beams are received and processed to provide first sum and first difference signals and second sum and second difference signals corresponding to the first and second actual beams, respectively. These signals are then supplied to the adder/subtracter unit which adds the first sum and first difference signals to provide a result $\Sigma_1 + K\Delta_1$, subtracts the first sum and first difference signals to provide a result $\Sigma_1 - K\Delta$, adds the second sum and second difference signals to provide a result $\Sigma_2 + K\Delta_1$, and subtracts the second sum and second difference signals to provide a result $\Sigma_2 - K\Delta_2$. These results are supplied to the video comparator/adder unit which generates the sum or difference signals corresponding to the apparent beam. Through the mere addition of a comparator/adder unit to a prior art multiple-feed monopulse radar system, the precision of target range, azimuth angle or elevation angle measurements may be increased dramatically without significantly increasing the size, cost or complexity of the monopulse radar system.

18 Claims, 9 Drawing Sheets

METHOD AND APPARATUS OF GENERATING SUM OR DIFFERENCE SIGNALS CORRESPONDING TO AN APPARENT BEAM IN A MONOPULSE RADAR SYSTEM

BACKGROUND OF THE INVENTION

Field of the invention

This invention is directed to an apparatus and method for processing sum or difference signals generated by a multi-mode antenna feed to increase the precision of target range, azimuth angle or elevation angle measurements and the like, in a monopulse radar system without significantly increasing cost, size or complexity.

Description of Related Art

Figure 1:
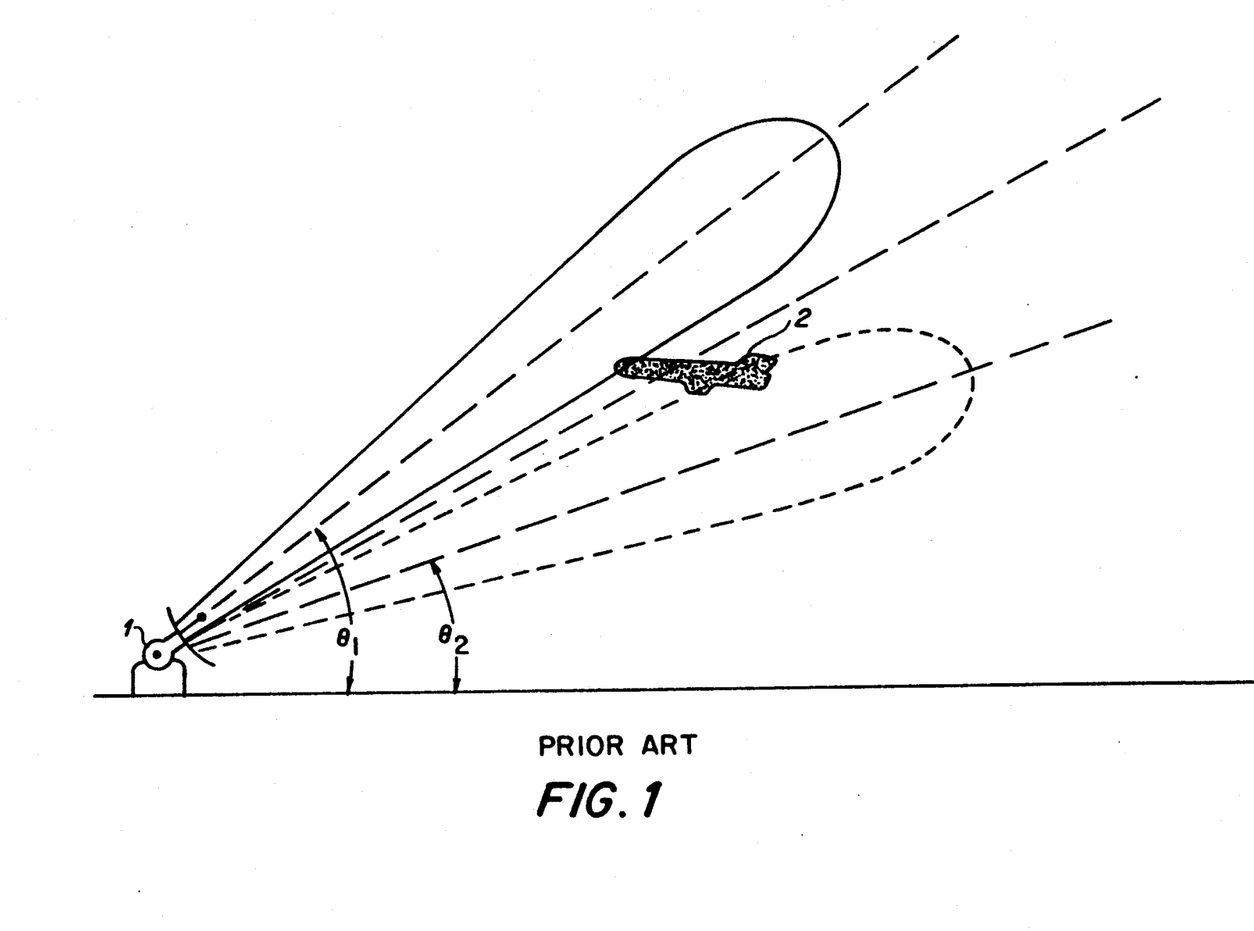
FIG. 1 is a diagram of a prior art radar system using sequential lobing.

FIG. 1 is an example of a prior art radar system. The radar system 1 generates an antenna beam having an axis of symmetry (e.g., boresight axis) at a particular angle $\Theta_1$ with respect to a reference plane. In this case, the reference plane is the surface upon which the radar system 1 is mounted. A target 2 in the coverage area of the antenna beam, causes a reflection or radar return signal termed an 'echo', which is received and processed by the radar system 1. The time difference between the transmission of the antenna beam and the reception of the echo signal is indicative of the range of the target 2.

However, in the prior art system of FIG. 1, the angle between the axis of symmetry of the antenna beam and the actual location of the target 2 generally cannot be determined without varying the attitude of the antenna of the radar system 1. This is because the echo received by the radar system 1 contains no indication as to whether the target 2 is above or below the axis of symmetry of the antenna beam. Therefore, the attitude of the radar system 1 must generally be changed across a switching axis from the angle $\Theta_1$ to some other angle $\Theta_2$ to determine the target angle. In this case, the amplitude of the echo signal caused by an antenna beam with an axis of symmetry disposed at an angle $\Theta_2$ has a stronger echo relative to the antenna beam with an axis of symmetry disposed at an angle $\Theta_1$. Therefore, it is generally known that the axis of symmetry of the radar system 1 at $\Theta_2$ more closely corresponds to the actual target angle than the antenna beam with an axis of symmetry at $\Theta_1$. In fact, the difference in amplitudes between the echo from the antenna beam at $\Theta_1$ and $\Theta_2$ is a measure of the angular displacement of the target from the switching axis. Therefore, it is possible to determine the elevation angle or the azimuth angle of the target 2. This method is known in the art as sequential lobing.

Radar techniques such as sequential lobing are subject to time varying amplitude fluctuations in the echo signal due to, for example, a change in target profile. To overcome this problem, radar systems have been developed which simultaneously emit at least two angularly separate antenna beams from which target range, azimuth angle or elevation angle information and the like can be extracted. Such systems are termed monopulse radar systems.

Figure 2:
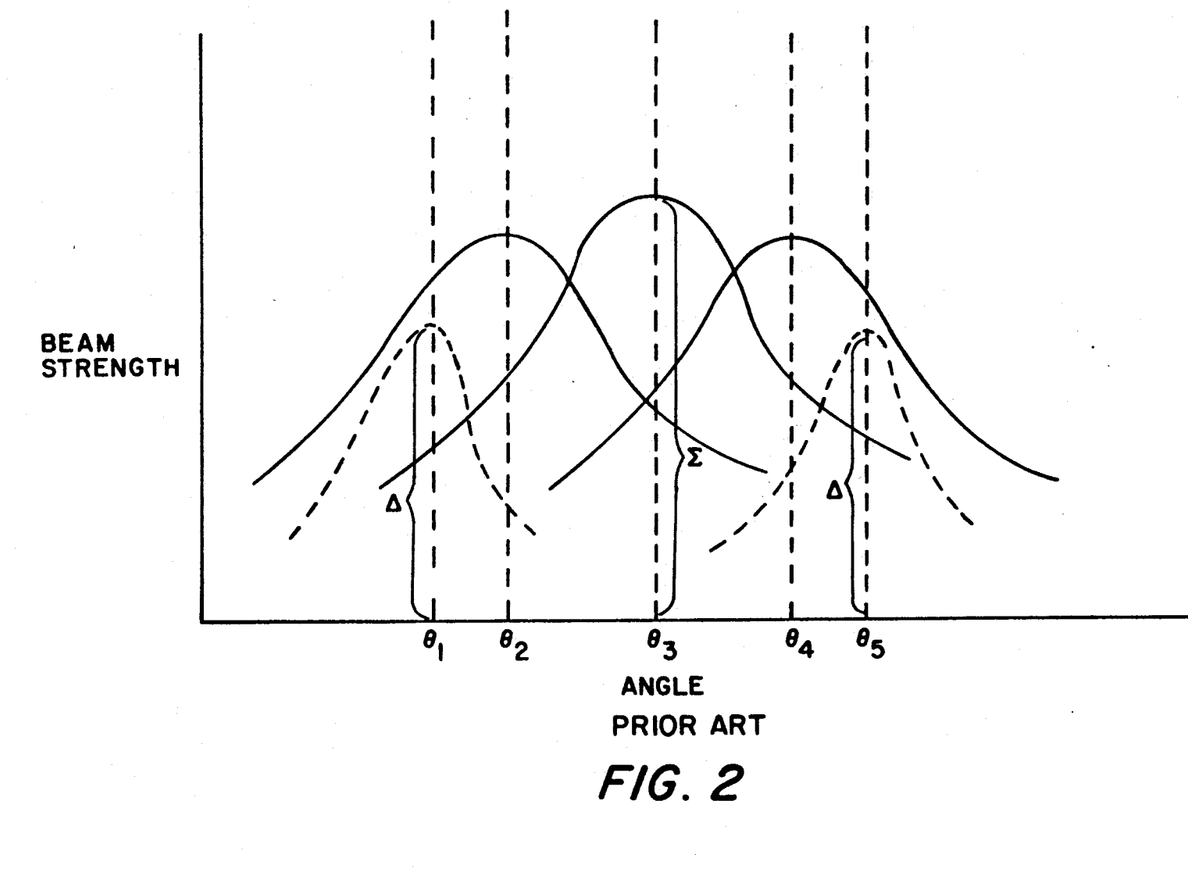
FIG. 2 is a graph of angle versus a beam strength for one angle axis of a prior art monopulse radar system.

FIG. 2 is a graph of angle versus beam strength for one angle axis of a prior art monopulse radar system. The graph depicts a situation in which a receiver simultaneously receives at least two separate antenna beams for each angle axis. The actual beam pattern generated by the antenna beams centered at angles $\Theta_2$ and $\Theta_4$ is a sum and difference of these two antenna beams. Specifically, a sum signal $\Sigma$ is received with a peak at an angle $\Theta_3$, and a difference signal $\Delta$ is received with two peaks at angles $\Theta_1$ and $\Theta_5$. The difference signal $\Delta$ is used to track angular position. The two lobes of $\Delta$ are of opposite phase (180° apart). Thus knowledge of the phase of $\Delta$ returned by target 2, combined with the amplitude of $\Delta$ or $\Sigma$ returned, tells the radar the angular position of target 2. More specifically, echoes received as sum and difference signals are used to determine target range using a target range output signal derived according to the relation:

$$R_{target} = \log(\Sigma + K\Delta) + \log(\Sigma - K\Delta) \tag{1}$$

while echoes from the sum and difference signals are used to determine target azimuth or elevation angle according to the relation:

$$\Theta_{target} = \log(\Sigma + K\Delta) - \log(\Sigma - K\Delta), \tag{2}$$

where $\Sigma$ denotes the sum signal, $\Delta$ denotes the difference signal, and K is a constant which depends on characteristics of the radar system. Relation (1) is more fully explained in "Reliability Without Redundancy from a Radar Monopulse Receiver" authored by Robert S. Noblit, published December, 1967 in *Microwaves*, which is incorporated herein by reference. Relation (2) is discussed in U.S. Pat. No. 3,740,750 for a Monopulse Receiver System, issued Jun. 19, 1973 to J. A. Moulton (hereinafter, "Moulton"), which is incorporated herein by reference.

Figure 3:
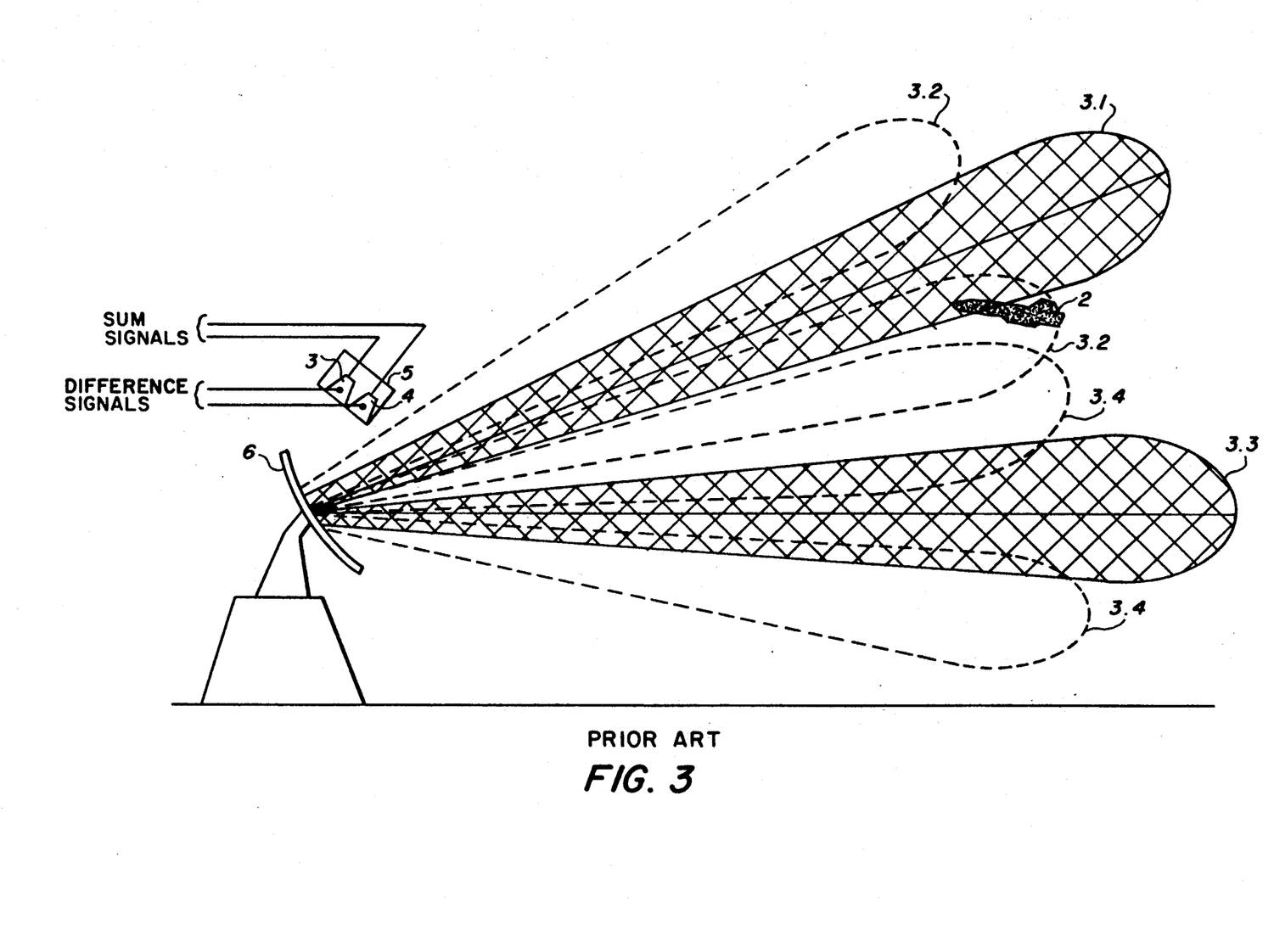
FIG. 3 is a diagram of a prior art multiple-feed monopulse radar system illustrating the beam patterns generated by such system.

FIG. 3 is a prior art multiple-feed sum-and-difference monopulse radar system. A first multi-mode antenna feed 3 generates a sum signal represented by a cross-hatched area 3.1 in which target 2 is located. In addition, the first multi-mode antenna feed 3 generates the difference signal 3.2 symmetrically displaced about such sum signal similar to those of FIG. 2. Likewise, a second multi-mode antenna feed 4 generates a similar pattern 3.3 (sum), 3.4 (difference) to that of the first multi-mode antenna feed 3 upon irradiation of the paraboloid 6.

Echoes from the target 2 are received by the first multi-mode antenna feed 3 which extracts an echo corresponding to the received sum signal and an echo corresponding to the received difference signal. Due to the physical configuration of the first multi-mode antenna feed 3, the echoes from the sum and difference signals may be received and processed separately. Structures which can accomplish this result are well known. For example, a magic T, a rat race, or a short-slot coupler may be used to separate and extract signals corresponding to the echoes caused by the sum and difference signals.

Figure 4:
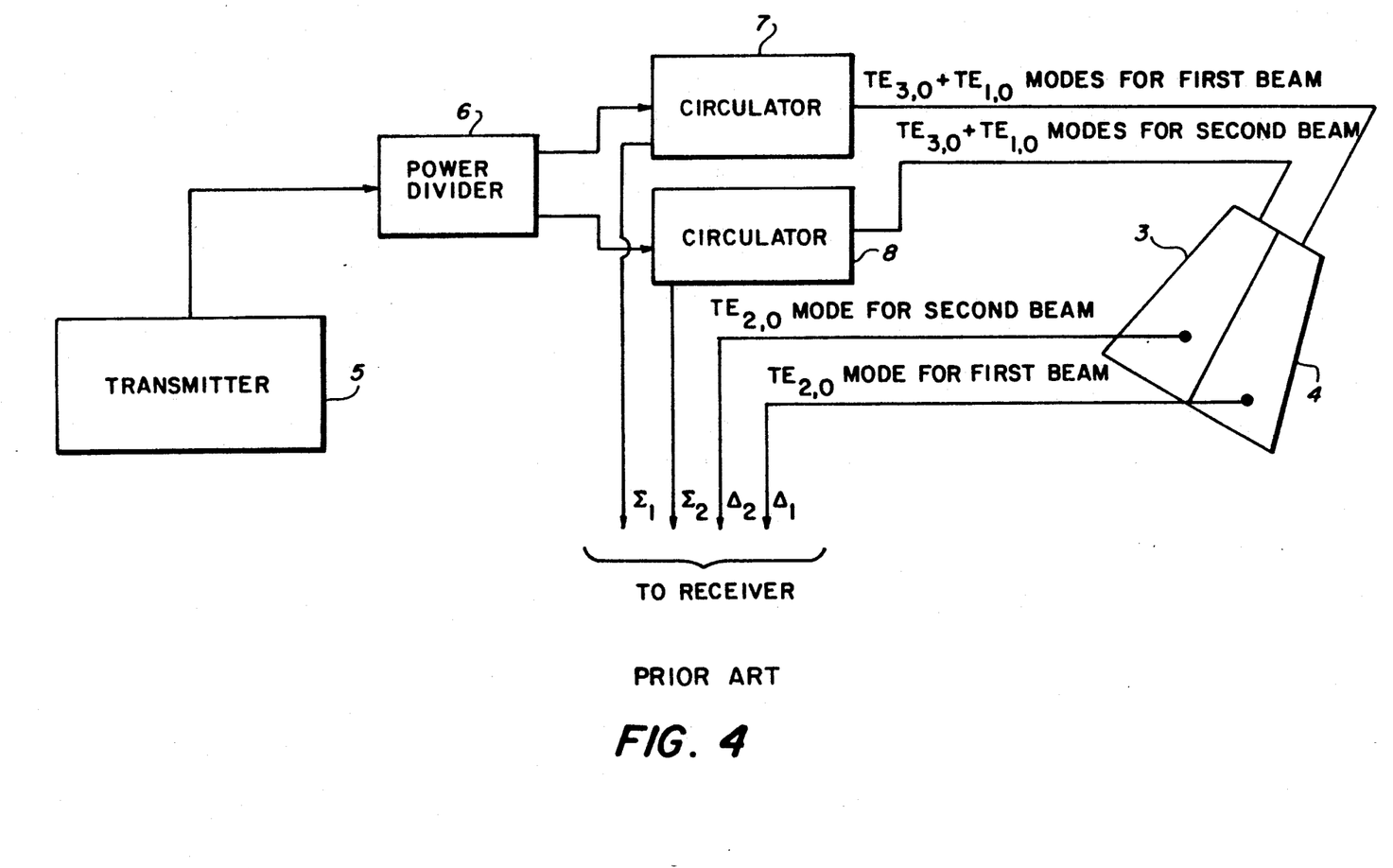
FIG. 4 is a block diagram of prior art UHF circuitry used in a multiple-feed monopulse radar system.

In the prior art multiple-feed sum-and-difference monopulse radar system of FIG. 3, it should be noted that there is a limit as to the spacing of the first and second antenna beams. Even when the first and second multi-mode antenna feeds 3,4 are directly adjacent, there will be some minimum gap in between the coverage areas of the first and second antenna beams because of the physical configuration of the first and second multi-mode antenna feeds 3, 4. In other words, the placement of an additional multi-mode antenna feed in between multi-mode antenna feeds 3, 4 to provide radar coverage for the gap is not possible when the first and second multi-mode antenna feeds 3, 4 are adjacent. This problem is solved by the present invention, as will be explained FIG. 4 is a block diagram of prior art UHF (ultra-high frequency) circuitry which is used to transmit a sum signal and receive sum and difference signals in a multiple feed monopulse radar system. A transmitter 5 generates electric signals which are divided into two signals in a power divider 6. One of the two signals is provided to a first circulator 7 while the other of the two signals is provided to a second circulator 8. The first and second circulators 7, 8 are well known non-reciprocal devices in which electric signals received at a first port of each of the first and second circulators 7, 8 are output from a second port to the first and second multi-mode antenna feeds 3, 4 while a sum signal received at the second port of each of the first and second circulators 7, 8 from the first and second multi-mode antenna feeds 3, 4 is provided to a receiver system (not shown in FIG. 4) through a third port of each of the first and second circulators 7, 8.

Due to the physical characteristics of first and second multi-mode antenna feeds 3, 4 a sum $TE_{1,0}$ and $TE_{3,0}$ (transverse electric) modes is output from the first and second multi-mode antenna feeds 3, 4 to transmit first and second antenna beams as shown in FIG. 3. An echo signal received at first and second multi-mode antenna feeds 3, 4 has inherent electric propagation modes from which the sum and difference signals can be derived. Specifically, the $TE_{2,0}$ mode of the echo signal is used to derive the difference signals for each of the first and second multi-mode antenna feeds 3, 4. The first and second multi-mode antenna feeds 3, 4 are physically configured so that the $TE_{2,0}$ modes for each of the first and second multi-mode antenna feeds 3, 4 are extracted and supplied to the receiver system. On the other hand, the sum of the $TE_{1,0}$ and $TE_{3,0}$ modes for each of the first and second multi-mode antenna feeds 3, 4 is supplied to the first and second circulators 7, 8, respectively. Again, due to the physical configuration of first and second circulators 7, 8, the sum signals for each of the first and second multi-mode antenna feeds 3, 4 are extracted and supplied to the receiver system. These particular modes are exemplary and preferred, but are not critical to practice of the invention.

Figure 5:
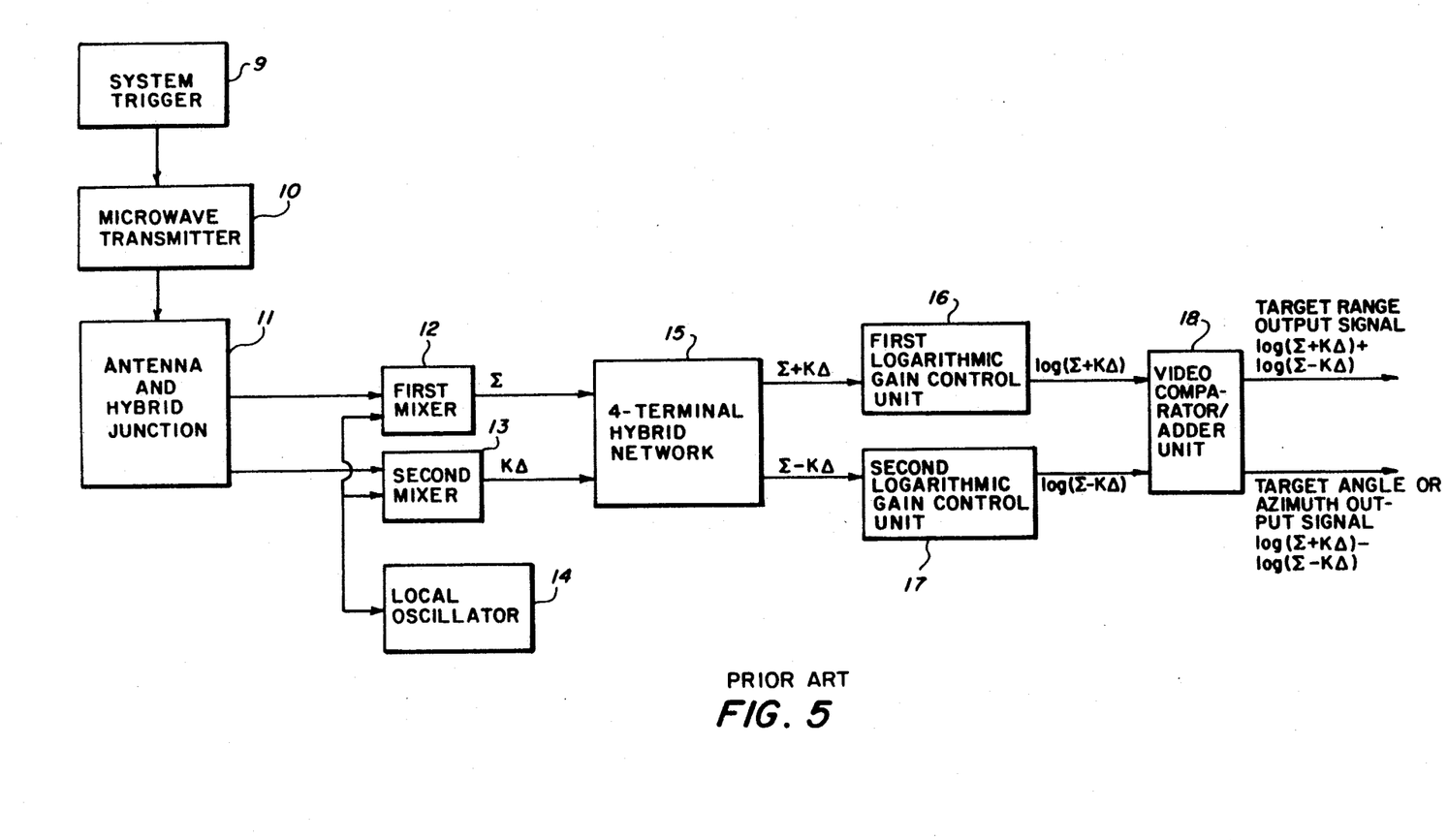
FIG. 5 is a block diagram of a prior art single-feed monopulse radar system.

FIG. 5 is a prior art single-feed monopulse radar system disclosed in Moulton, which is used in the description of the preferred embodiment of the invention. A system trigger 9 controls a microwave transmitter 10 which in turn supplies transmission signals to an antenna and hybrid junction 11. The antenna and hybrid junction 11 may have a configuration as shown in FIG. 4.

Sum and difference signals for one monopulse antenna beam are derived from the antenna and hybrid junction 11 and supplied to first and second mixers 12, 13, respectively. The sum and difference signals are then mixed in the first and second mixers 12, 13, respectively, with a signal from a local oscillator 14. Through this mixing operation, beat signals are generated in the first and second mixers 12, 13 and the sum signal, $\Sigma$, and the difference signal multiplied by a constant, $K\Delta$, are thereby extracted. These beam signals are then supplied to a first 4-terminal hybrid network 15 to produce a first signal proportional to the sum signal plus the difference signal multiplied by a constant, $\Sigma + K\Delta$, and a sum signal minus a difference signal multiplied by a constant, $\Sigma - K\Delta$. The logarithm of each of these signals is generated in first and second logarithmic gain control units 16, 17, respectively. Then, the sum of such signals is used to generate the target range output signal according to relation (1), in a video comparator/adder unit 18. Likewise, the difference between such signals is generated in the video comparator/adder unit 18 to generate a target azimuth angle output signal or a target elevation angle output signal, according to relation (2). The target range output signal and the target azimuth angle or elevation angle output signal may be further processed to generate a signal indicative of target altitude.

In general, the precision of target range, azimuth angle or elevation angle measurements and the like in monopulse radar systems is dependent upon the number of antenna feeds used and the complexity of the circuitry employed in such systems. An increase in the number of antenna feeds or in the complexity of the circuitry used to process signals from such antenna feeds leads to increased cost of such systems. Therefore, there is a need in the art to increase the precision of target range, azimuth angle, or elevation angle measurements and the like, without significantly increasing the cost or complexity of a monopulse radar system.

Further, there is a need in the art to provide radar coverage in gaps which exist in prior art monopulse radar systems due to the physical configuration of the antenna feeds in such systems, as explained with respect to FIG. 3.

SUMMARY OF THE INVENTION

An object of the present invention is to provide increased precision in target range, azimuth angle or elevation angle measurements without significantly increasing the size, cost or complexity of a monopulse radar system.

Another object of the present invention is to provide radar coverage in gaps which exist in prior art monopulse radar systems due to the physical configuration of the antenna feeds in such systems.

These objects, and others made apparent hereinafter, are obtained by the apparatus and method herein disclosed. According to the present invention, a transmitter/receiver unit generates first and second actual beams. Echoes from such beams are used to generate a first sum signal and a first difference signal based on the first actual beam, and a second sum signal and second difference signal based on the second actual beam. An adder/subtracter unit then adds at least one of the first sum signal and the first difference signal and the second sum signal and the second difference signal, to provide a first result, and subtracts at least one of the first sum signal and the first difference signal and the second sum signal and the second difference signal, to provide a second result. A comparator/adder unit receives the first and second results, and generates a target range, azimuth angle or elevation angle output signal corresponding to the apparent beam, based on one of the first and second results. Thus, the apparatus and method of the claimed invention allow for an increased radar coverage of a given area by effectively using the apparent beam disposed at an angle between the first and second actual beams without significantly increasing the size, cost or complexity of the radar system. Also, the apparatus and method of the claimed invention allows for radar coverage in gaps which exist in prior art monopulse radar systems due to the physical configuration of the antenna feeds in such systems.

DESCRIPTION OF THE PREFERRED EMBODIMENTS

Figure 6:
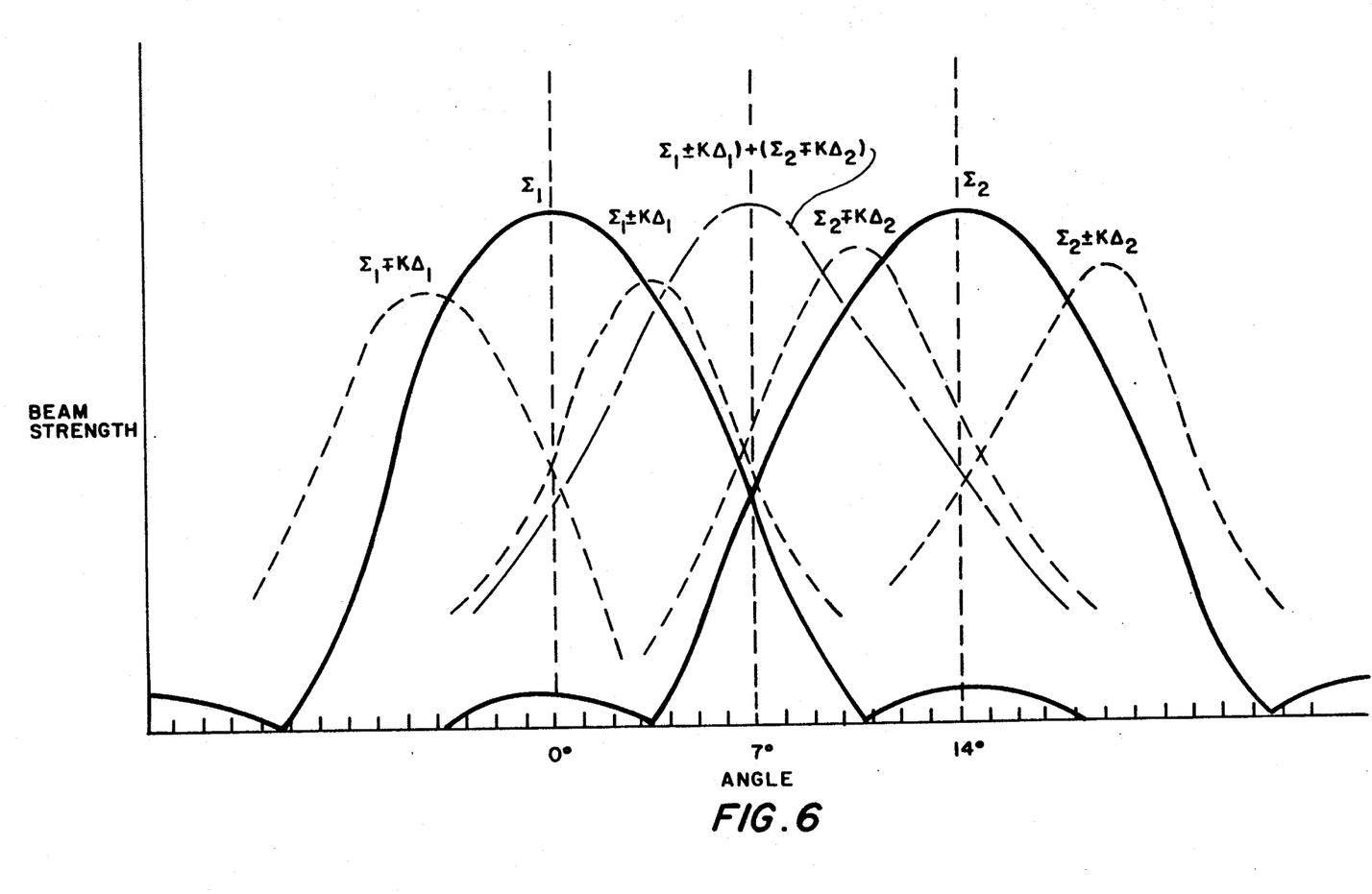
FIG. 6 is a graph of beam angle versus beam strength for one angle axis, for illustrating a general principle of the present invention.

FIG. 6 is a graph of angle versus beam strength for one angle axis, which illustrates a general principle of the present invention. A first monopulse sum signal is centered about an axis of symmetry at 14° relative to some reference plane, e.g., the surface of the earth. A second monopulse sum signal has an axis of symmetry centered about 0°, i.e., parallel to the surface of the earth in FIG. 6.

If the difference signal corresponding to the first actual beam is added to or subtracted from the sum signal corresponding to the first actual beam, the beam strength of the result is as illustrated in dashed lines in FIG. 6. These signals are denoted $\Sigma_1 \pm K\Delta_1$ and $\Sigma_1 \pm K\Delta_1$. "The ± or" — symbols are used to indicate that the $\Sigma_1$ and $K\Delta_1$ signals are added to or subtracted from each other according to the phasing of the monopulse radar system.

Likewise, if the difference signal corresponding to the second actual difference signal is added to or subtracted from the sum signal of the second actual antenna beam, the resulting signals are illustrated as $\Sigma_2 \pm K\Delta_2$ and $\Sigma_2 \pm K\Delta_2$.

By adding the result of $\Sigma_1 \pm K\Delta_1$ and $\Sigma_2 \pm K\Delta_2$, a sum signal results centered about an angle of 7°, as shown by the chain line of FIG. 6. This sum signal represents an apparent beam centered between the first and second actual beams. In addition, the signals $\Sigma_1 \pm K\Delta_1$ and $\Sigma_2 \pm K\Delta_2$ may be used to generate the difference signal corresponding to the apparent beam. Therefore, it is evident that this apparent beam may be used to generate additional target information from signals used in prior art monopulse radar systems. As an example, if $\Delta_1$ and $\Delta_2$ are balanced, i.e. about the same width and gain, then the combination of signals:

$$(\Sigma_1 \pm K\Delta_1) + (\Sigma_2 \pm K\Delta_1)$$

reduces to $\Sigma_1 + \Sigma_2$. This is a synthetic sum signal centered between the beams generated by e, r, t, 6 of FIG. 3, at 7° for the example of FIG. 6. Similarly, if $\Sigma_1$ and $\Sigma_2$ are balanced, and the radar combines signals as follows:

$$(\Sigma_1 \pm K\Delta_1) - (\Sigma_2 \pm K\Delta_1)$$

one gets $K(\Delta_1 + \Delta_2)$, multilobed synthetic difference signal with a null at 7°. Having thus generated synthetic sum and difference lobes centered at the centerline (7° in the example), the system can track both range and angular position of a target, even one which approches along what was formerly a tracking "gap" in the system. The system does this by processing existing information, rather than by the adding more and more feed horns.

Figure 7:
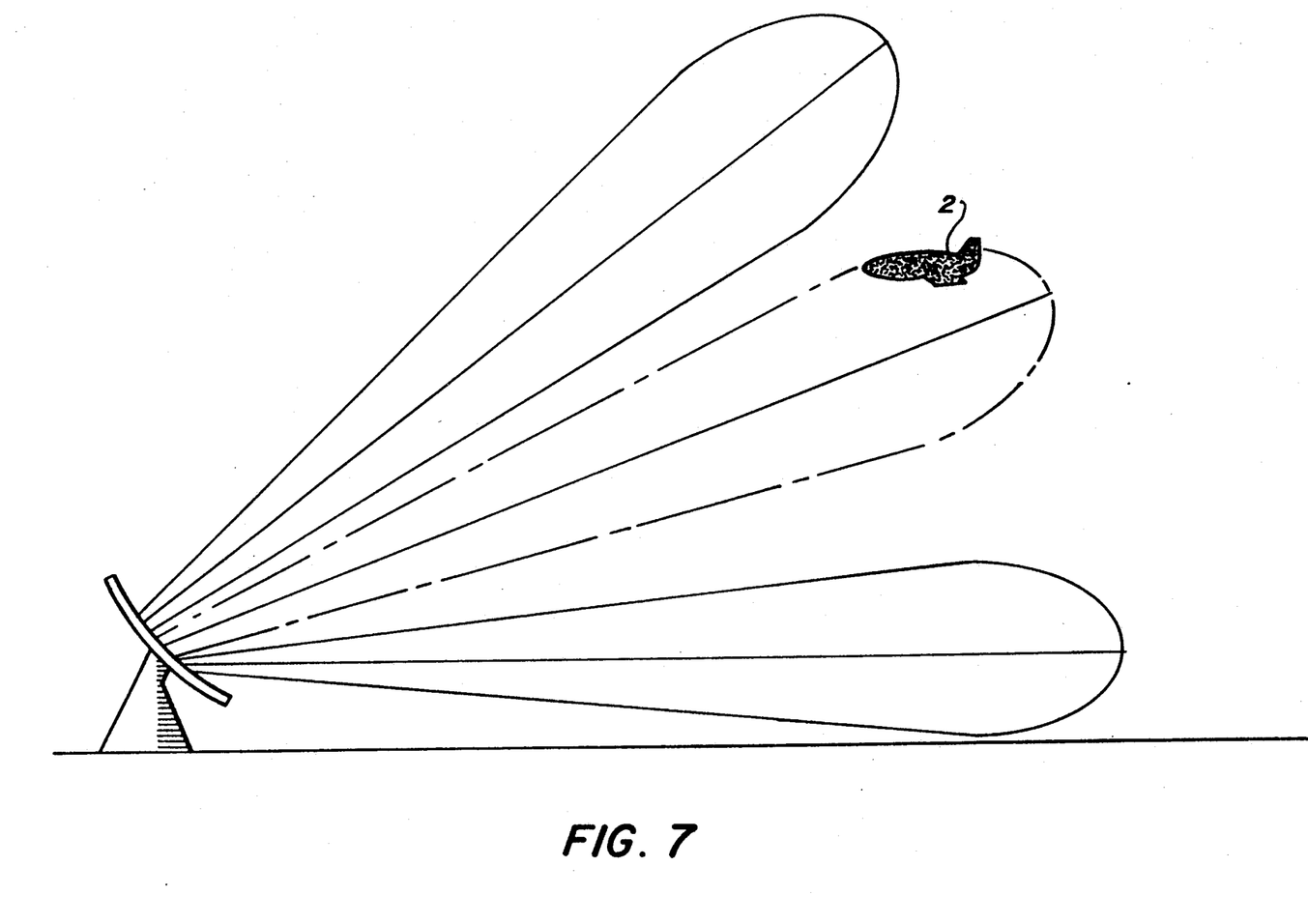
FIG. 7 is a diagram illustrating the general principle of the present invention.

FIG. 7 illustrates the ability of the present invention to provide target range, azimuth angle or elevation angle measurements and the like with increased precision relative to the prior art, using the apparent beam of FIG. 6. The antenna beam bordered with a chain line illustrates the apparent beam disposed between the first and second actual antenna beams. The apparent beam may be used to detect the target range, azimuth angle, or elevation angle and the like, of target 2, whereas the prior art monopulse system would not have been able to provide any information concerning the presence or location of target 2 in between the first and second actual beams, as explained above.

Figure 8:
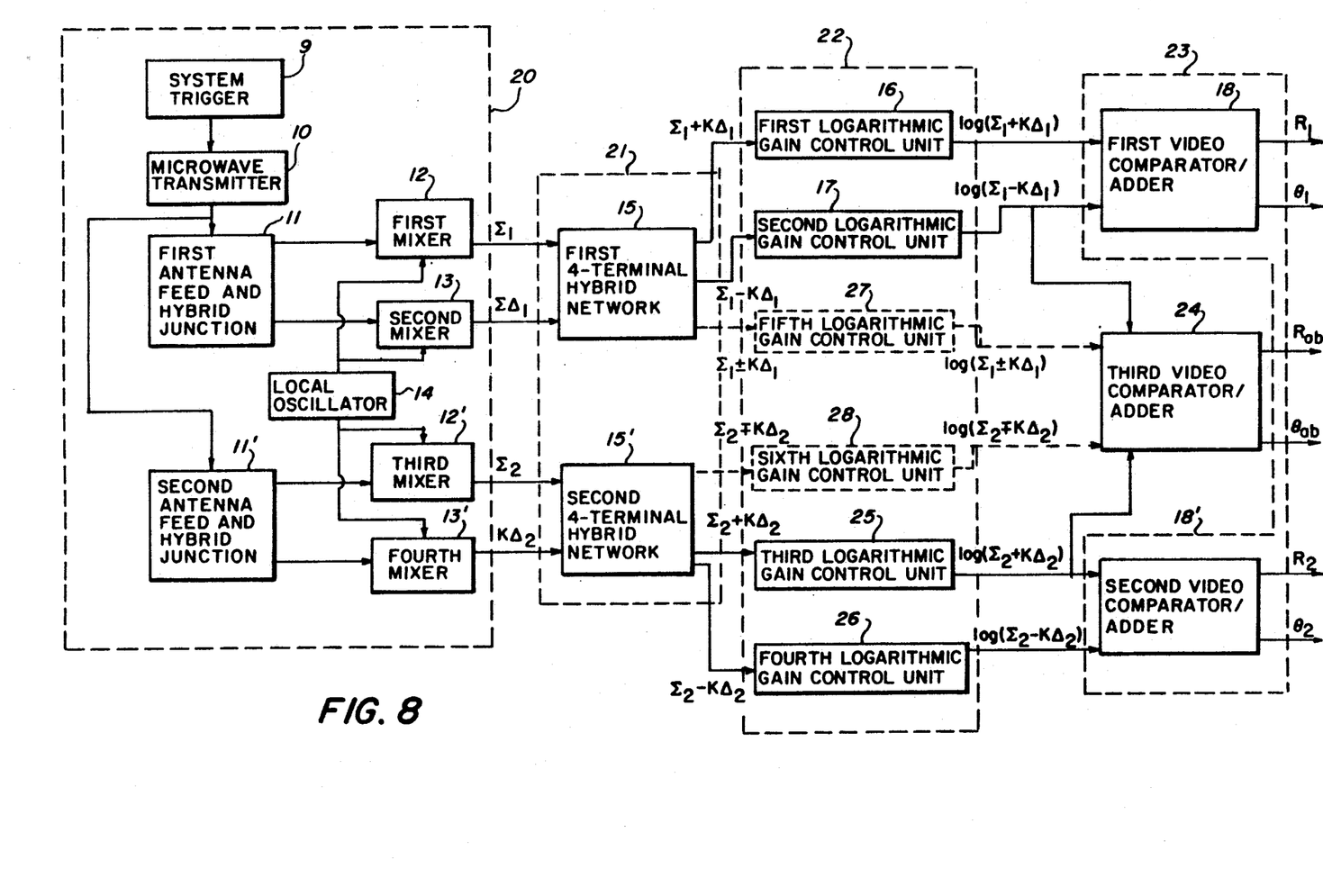
FIG. 8 is a block diagram of a first part of a multiple-feed monopulse radar system according to a preferred embodiment of the present invention.

FIG. 8 is a block diagram of a first part of a multiple-feed monopulse radar system according to a preferred embodiment of the present invention. In general terms, the system includes a transmitter/receiver unit 20, an adder/subtracter unit 21, an amplifier unit 22, a video comparator/adder unit 23 including first and second video comparator/adder units 18, 18', and a third video comparator/adder unit 24. In this preferred embodiment, two prior art Moulton single-feed monopulse radar systems of FIG. 5 are coupled so that the local oscillator 14 is common to both systems. In addition, the third video comparator/adder 24, newly provided in accordance with the present invention, is coupled to at least one of the first and second logarithmic gain control units 16, 17, and at least one of third and fourth logarithmic gain control units 25, 26 to generate target range, azimuth angle or elevation angle output signals corresponding to the apparent beam. Alternatively, the third comparator/adder 24 may be coupled to fifth and sixth logarithmic gain control units 27, 28 to generate target range and azimuth angle or elevation angle output signals corresponding to the apparent beam.

The transmitter/receiver unit 20 generates first and second actual beams. Echoes from the first and second actual beams are received by the transmitter/receiver unit 20 and processed into first sum and first difference signals (denoted $\Sigma_1$ and $K\Delta_1$, respectively, where K is a constant which depends upon characteristics of the radar system) based on the first actual beam. From the echoes, the transmitter/receiver unit 20 also receives and generates second sum and second difference signals (denoted $\Sigma_2$ and $K\Delta_2$, respectively) based on the second actual beam. The adder/subtracter unit 21 receives these signals and adds the first sum signal and the first difference signal to provide a result denoted $\Sigma_1 + K\Delta_1$, subtracts the first sum signal and the first difference signal to provide a result denoted $\Sigma_1 - K\Delta_1$, adds the second sum signal and the second difference signal to provide a result denoted $\Sigma_2 + K\Delta_2$, and subtracts the second sum signal and the second difference signal to provide a result denoted $\Sigma_2 - K\Delta_2$. These results are supplied to the amplifier unit 22 and logarithmically amplified. The logarithmically amplified outputs of these results are then supplied to the video comparator/adder unit 23 which includes first and second video comparator/adder units 18, 18′, and which generates target range and azimuth angle or elevation angle output signals corresponding to the first and second actual beams in accordance with relations (1) and (2).

As explained above, a key feature of the present invention is the third video comparator/adder unit 24. Structurally, the third video comparator/adder unit 24 is equivalent to the prior art video comparator/adder unit 23, but the signals upon which the video comparator/adder unit 24 operates differ from those of the prior art. Such third video comparator/adder unit 24 receives the amplified outputs of one of the sum plus difference signal and sum minus difference signal corresponding to the first actual beam, and the logarithmically amplified outputs of one of the second sum plus difference signal and second sum minus difference signal corresponding to the second actual beam and operates on such signals to generate sum and difference signals corresponding to an apparent beam. Specifically, the third video comparator/adder unit 24 performs the operation $\log(\Sigma_1 \pm K\Delta_1) + \log(\Sigma_2 \pm K\Delta_2)$ to generate the target range output signal $R_{ab}$ for determining target range for the apparent beam. In addition, the third comparator/adder unit 24 may be employed to compute the relation $\log(\Sigma_1 \pm K\Delta_1) - \log(\Sigma_2 \pm K\Delta_2)$ to produce target azimuth angle or elevation angle output signal $\Theta_{ab}$ corresponding to the apparent beam. Thus, the monopulse radar system of the present invention is capable of generating a target range output signal $R_{ab}$ or target azimuth angle or elevation angle output signal $\Theta_{ab}$ corresponding to the apparent beam, a feature which allows for increased precision in target range, azimuth angle, or elevation angle measurements with merely the addition of the third video comparator/adder unit 24 in a multiple-feed monopulse radar system.

Figure 9:
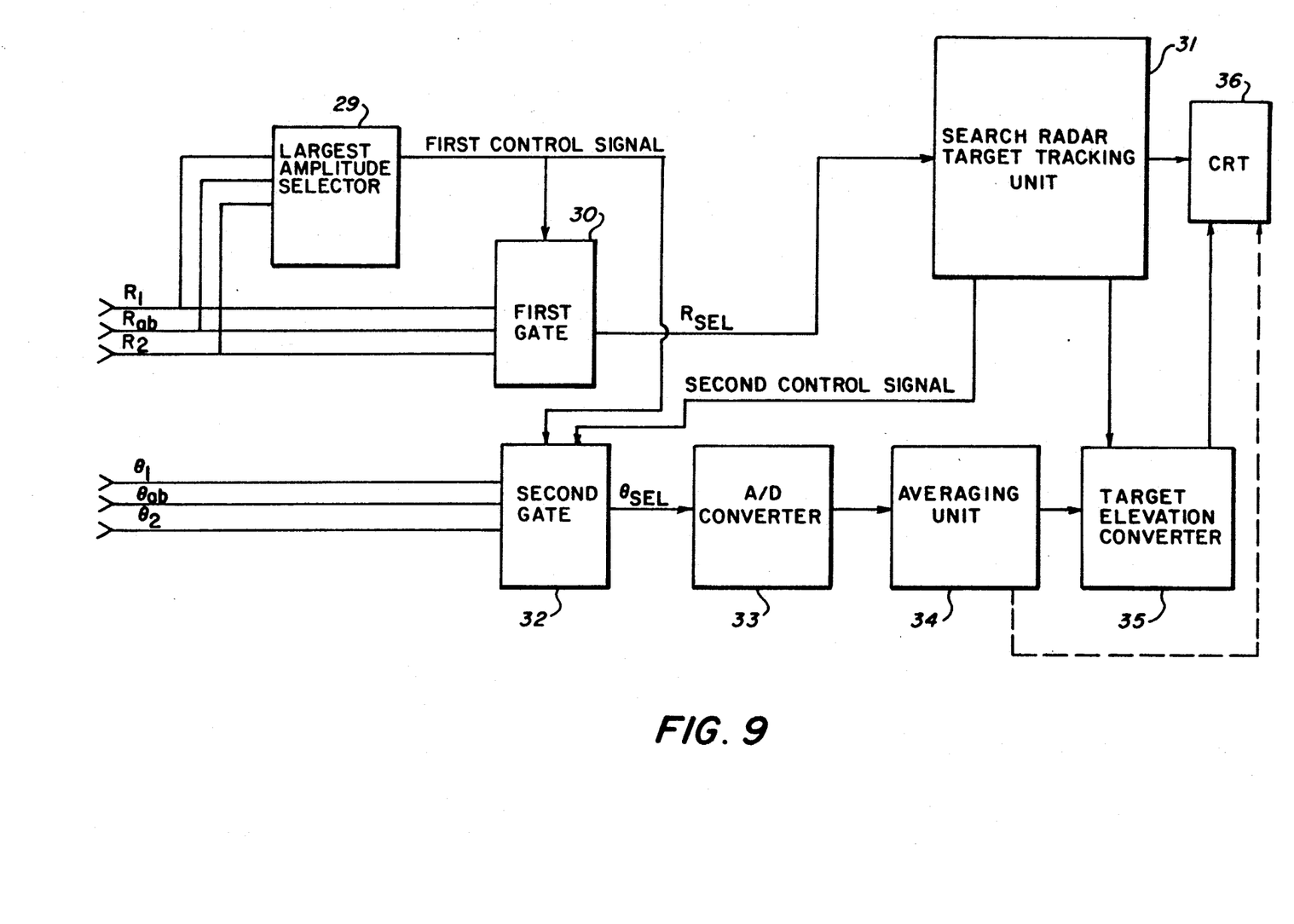
FIG. 9 is a block diagram of a second part of a multiple-feed monopulse radar system according to a preferred embodiment of the present invention.

FIG. 9 is a block diagram of a second part of a multiple-feed monopulse radar system according to a preferred embodiment of the present invention. The second part of the multi-feed monopulse radar system is supplied with the target range output signals $R_1$, $R_{ab}$, $R_2$ and target azimuth angle or elevation angle output signals $\Theta_1$, $\Theta_{ab}$, $\Theta_2$. The target range output signals $R_1$, $R_{ab}$, $R_2$ are supplied to a conventional largest amplitude selector 29 which determines which of the target range output signals $R_1$, $R_{ab}$, $R_2$ has the largest amplitude, and which generates a first control signal indicative of the target range output signal which has the largest amplitude. The largest amplitude selector 29 may be realized in several ways. In one form, the largest amplitude selector 29 may be composed of three comparators and a decoder or logic circuit. By comparing each of target range output signals $R_1$, $R_{ab}$, $R_2$ in pairs, an output signal including three bits may be supplied to a decoder or a logic circuit to generate the first control signal. Alternatively, the largest amplitude selector 29 may be realized in digital form with a microprocessor which compares the target range output signals $R_1$, $R_{ab}$, $R_2$ in pairs and determines which of the target range output signals $R_1$, $R_{ab}$, $R_2$ has the largest amplitude. On the basis of this determination, such microprocessor may be employed to generate the first control signal.

Based on the first control signal, first conventional gate 30 selects one of the target range output signals $R_1$, $R_{ab}$, $R_2$ and provides the selected target range output signal $R_{sel}$ to a conventional search radar target tracking unit 31. Systems such as the search radar target tracking unit 31 are well known. For example, the search radar target tracking unit 31 may be a MCAT (micro computer-aided tracking) unit, disclosed in Naval Research Laboratory Report 8709 dated Jul. 12, 1983, which is incorporated herein by reference.

The search radar target tracking unit 31 generates a second control signal indicative of a target corresponding to a range indicated by the target range output signal $R_{sel}$. When a target at the range indicated by the target range output signal $R_{sel}$ has been selected, the search radar target tracking unit 31 generates the second control signal which is provided to a second conventional gate 32. On the other hand, when no target at the range indicated by the target range output signal $R_{sel}$ has been selected, the search radar target tracking unit 31 will not activate the second gate 32.

When activated by the second control signal, the second gate 32 allows one of the target azimuth angle or elevation angle output signals $\Theta_1$, $\Theta_{ab}$, $\Theta_2$ corresponding to the selected target range output signal $R_{sel}$ to pass through the second gate 32, as selected target azimuth angle or elevation angle output signal $\Theta_{sel}$. The selected target azimuth angle or elevation angle output signal $\Theta_{sel}$ is then supplied to a conventional analog-to-digital converter 33.

Upon conversion, a digital output signal indicative of the selected target azimuth angle or elevation angle output signal is supplied to a conventional averaging unit 34. The averaging unit 34 stores digitally-converted target azimuth angle or elevation angle output signals for a predetermined number of scans of the multiple-feed monopulse radar system of FIGS. 8 and 9. The averaging unit 34 also sums a predetermined number of selected target azimuth angle or elevation angle output signals corresponding to the predetermined number of scans, and divides the sum by the predetermined number of scans to generate an average target azimuth angle or elevation angle output signal. An average target azimuth angle or elevation angle value corresponding to the average target azimuth angle or elevation angle output signals, respectively, may be displayed on conventional CRT 36 (cathode ray tube) in correspondence with the selected target.

A similar averaging operation to that performed in the averaging unit 34 is also performed in the search radar target tracking unit 31 for the selected target range output signals corresponding to the predetermined number of scans. In accordance with this operation, the search radar target tracking unit 31 generates an average target range output signal which is supplied to a conventional target elevation converter 35. Also, an average target range value corresponding to the average target range output signal may be displayed on the CRT 36 in correspondence with the selected target.

Based on the average target azimuth angle or elevation angle output signal and the average target range output signal, the target elevation converter 35 determines an average altitude value of the target and supplies this value to the CRT 36 for display of the target altitude in correspondence with the selected target. Specifically, the average target range output signal is subtracted from the average target elevation angle output signal to generate a difference. Based on this difference, a value is read from a look-up table included within target elevation converter 35 to provide a value indicative of average target altitude.

Therefore, in general terms, the search radar target tracking unit 31, the averaging unit 34, the target elevation converter 35 and the CRT 36 operate to generate target range, azimuth angle and elevation angle output signals corresponding to the apparent beam, based on the first sum signal, the second sum signal, the first difference signal and/or the second difference signal. In addition, the search radar target tracking unit 31, the averaging unit 34, the target elevation converter 35 and the CRT 36 may operate to generate average target range, azimuth angle and elevation angle output signals corresponding to the apparent beam based on the first sum signal, the second sum signal, the first difference signal and/or the second difference signal.

The many features and advantages of the present invention are apparent from the detailed specification and thus, it is intended by the appended claims to cover all such features and advantages of the invention which follow in the true spirit and scope thereof. Further, since numerous modifications and changes will readily occur to those skilled in the art, it is not desired to limit the invention to the exact construction and operation illustrated and described. Accordingly, all suitable modifications and equivalents may be resorted to as falling within the scope and spirit of the invention.

What is claimed is:

1. A method for generating at least one of target range, azimuth angle and elevation angle output signals corresponding to an apparent beam, based on first and second actual beams generated by a multiple-feed monopulse radar system, comprising the steps of:
   a) receiving a first sum signal and a first difference signal corresponding to the first actual beam;
   b) receiving a second sum signal and a second difference signal corresponding to the second actual beam;
   c) adding at least one of the first sum signal and the first difference signal, and the second sum signal and the second difference signal, to provide a first result;
   d) subtracting at least one of the second sum signal and the second difference signal, and the first sum signal and the first difference signal, to provide a second result; and
   e) generating at least one of the target range, azimuth angle and elevation angle output signals corresponding to the apparent beam, based on the first and second results.

2. A method as claimed in claim 1, further comprising the step of:
   f) displaying at least one of average target range, azimuth angle, elevation angle and altitude values based on at least one of the target range, azimuth angle, and elevation angle output signals for a predetermined number of scans of the multiple-feed monopulse radar system.

3. A method as claimed in claim 1, further comprising the step of:
   f) logarithmically amplifying at least one of the first and second results before performing said step (e).

4. A method as claimed in claim 1, further comprising the step of:
   f) generating at least one of the average target range, azimuth angle, and elevation angle output signals corresponding to at least one of the first and second actual beams, based on at least one of the first and second results of said steps (c) and (d), respectively.

5. A method as claimed in claim 4, further comprising the steps of:
   g) displaying at least one of average target range, azimuth angle, elevation angle and altitude values based on at least one of the target range, azimuth angle and elevation angle output signals, corresponding to at least one of the first actual beam, the second actual beam and the apparent beam.

6. A method as claimed in claim 4, further comprising the step of:
   g) logarithmically amplifying at least one of the first and second results before performing said step (f).

7. A system for generating at least one of target range, azimuth angle and elevation angle output signals corresponding to an apparent beam based on first and second actual beams generated by a monopulse radar system, comprising:
   a transmitter/receiver unit generating the first and second actual beams, and generating a first sum signal and a first difference signal based on the first actual beam, and a second sum signal and a second difference signal based on the second actual beam;
   an adder/subtracter coupled to the said transmitter/receiver unit, adding at least one of the first sum signal and the first difference signal, and the second sum signal and the second difference signal, to provide a first result, and subtracting at least one of the second sum signal and second difference signal, and the first sum signal and the first difference signal, to provide a second result; and
   a comparator/adder unit coupled to said adder/subtracter unit, and generating at least one of target range, azimuth angle, and elevation angle output signals corresponding the apparent beam, based on the first and second results.

8. A system as claimed in claim 7, further comprising:
   a display coupled to said comparator/adder unit, and displaying at least one of average target range, azimuth angle, elevation angle and altitude values for a predetermined number of scans of said system, based on the at least one of the target range, azimuth angle and elevation angle output signals generated by said comparator/adder unit.

9. A system as claimed in claim 7, further comprising:
   a largest amplitude selector coupled to said comparator/adder unit, receiving at least two of the target range output signals generated by said comparator/adder unit, and determining which of the at least two target range output signals has a largest amplitude to provide a target range output signal having a largest amplitude.

10. A system as claimed in claim 9, further comprising:
    a search radar target tracking unit coupled to said largest amplitude selector, receiving target range output signals having the largest amplitudes for each of a predetermined number of scans of said system, storing target range values corresponding to the target range output signals having the largest amplitudes for the predetermined number of scans, and averaging the target range output signals having the largest amplitudes for each of the predetermined number of scans to generate an average target range value for a target selected by an operator.

11. A system as claimed in claim 10, further comprising:

an averaging unit coupled to said comparator/adder unit, receiving at least one of target azimuth angle and elevation angle output signals corresponding to at least one of the first actual beam, the second actual beam and the apparent beam from said comparator/adder unit for each of the predetermined number of scans, averaging at least one of target azimuth angle and elevation angle values corresponding to the target azimuth angle and elevation output signals, respectively, for at least one of the first and second actual beams, and the apparent beam for each of the predetermined numbers of scans, and generating at least one of average target azimuth angle and elevation angle values corresponding to the target selected by the operator.

12. An apparatus as claimed in claim 11, further comprising:
a target elevation converter coupled to said averaging unit and said search radar target tracking unit, and generating an average target altitude for the target selected by the operator, based on the average target range value and the average target elevation angle value.

13. An apparatus as claimed in claim 7, further comprising:
an amplifier unit coupled between said adder/subtracter and said comparator/adder unit, and logarithmically amplifying at least one of the first and second results.

14. A system for generating at least one of target range, azimuth angle and elevation angle output signals corresponding to an apparent beam, based on first and second actual beams generated by a multiple-feed monopulse radar system, comprising:
means for receiving a first sum signal and a first difference signal corresponding to the first actual beam;
means for receiving a second sum signal and a second difference signal corresponding to the second actual beam;
means for adding at least one of the first sum signal and the first difference signal, and the second sum signal and the second difference signal, to provide a first result;
means for subtracting at least one of the second sum signal and the second difference signal, and the first sum signal and the first difference signal, to provide a second result; and
means for generating at least one of the target range, azimuth angle and elevation angle output signals corresponding to the apparent beam, based on the first and second results.

15. A system as claimed in claim 14, further comprising:
means for displaying at least one of average target range, azimuth angle, elevation angle and altitude values based on at least one of the target range, azimuth angle, and elevation angle output signals.

16. A system as claimed in claim 14, further comprising:
means for generating at least one of the target range, azimuth angle, and elevation angle output signals corresponding to at least one of the first and second actual beams, based on at least one of the first and second results of said steps (c) and (d) respectively.

17. A system as claimed in claim 16, further comprising:
means for displaying at least one of average target range, azimuth angle, elevating angle and altitude values based on at least one of the target range, azimuth angle and elevation angle output signals corresponding to at least one of the first actual beams, the second actual beam and the apparent beam.

18. A radar system comprising:
means for generating a first monopulse sum signal $\Sigma_1$, and a first monopulse difference signal $\Delta_1$;
means for generating a second monopulse sum signal $\Sigma_2$, and a second monopulse difference signal $\Delta_2$; and
means for generating a synthetic radar signal, said processing means consisting of the group whose members are: means for forming $(\Sigma_1 \pm K\Delta_1)+(\Sigma_2 \pm K\Delta_1)$; and means for forming $(\Sigma_1 \pm K\Delta_1)-(\Sigma_2 \pm K\Delta_1)$.

* * * * *